United States Patent
Cook et al.

(10) Patent No.: US 7,724,253 B1
(45) Date of Patent: May 25, 2010

(54) SYSTEM AND METHOD FOR DITHERING DEPTH VALUES

(75) Inventors: David Robert Cook, San Jose, CA (US); Mikhail V. Krivega, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 559 days.

(21) Appl. No.: 11/550,347

(22) Filed: Oct. 17, 2006

(51) Int. Cl.
*G06T 15/40* (2006.01)
*G09G 5/02* (2006.01)
*G09G 5/00* (2006.01)

(52) U.S. Cl. ........................ 345/422; 345/592; 345/629

(58) Field of Classification Search .................. 345/422, 345/592, 629
See application file for complete search history.

(56) References Cited

U.S. PATENT DOCUMENTS

| | | | | |
|---|---|---|---|---|
| 5,864,512 A | * | 1/1999 | Buckelew et al. | 365/230.01 |
| 6,169,609 B1 | * | 1/2001 | Jacob et al. | 358/1.9 |
| 6,590,573 B1 | * | 7/2003 | Geshwind | 345/419 |
| 2002/0030678 A1 | * | 3/2002 | Ostermann | 345/420 |
| 2004/0135795 A1 | * | 7/2004 | Raubacher et al. | 345/611 |
| 2006/0203010 A1 | * | 9/2006 | Kirchner et al. | 345/629 |
| 2007/0016425 A1 | * | 1/2007 | Ward | 704/271 |
| 2009/0244309 A1 | * | 10/2009 | Maison et al. | 348/222.1 |

OTHER PUBLICATIONS

U.S. Appl. No. 11/750,288, filed May 17, 2007.

* cited by examiner

*Primary Examiner*—Xiao M Wu
*Assistant Examiner*—David T Welch
(74) *Attorney, Agent, or Firm*—Zilka-Kotab, PC

(57) ABSTRACT

A system, and method are provided for dithering depth values. The depth values include a plurality of first depth values associated with a first object and a plurality of second depth values associated with a second object. Additionally, the first depth values and the second depth values are stored in a depth map in a predetermined configuration. In addition, the predetermined configuration takes on a checkerboard pattern.

12 Claims, 4 Drawing Sheets

FIG. 1
(PRIOR ART)
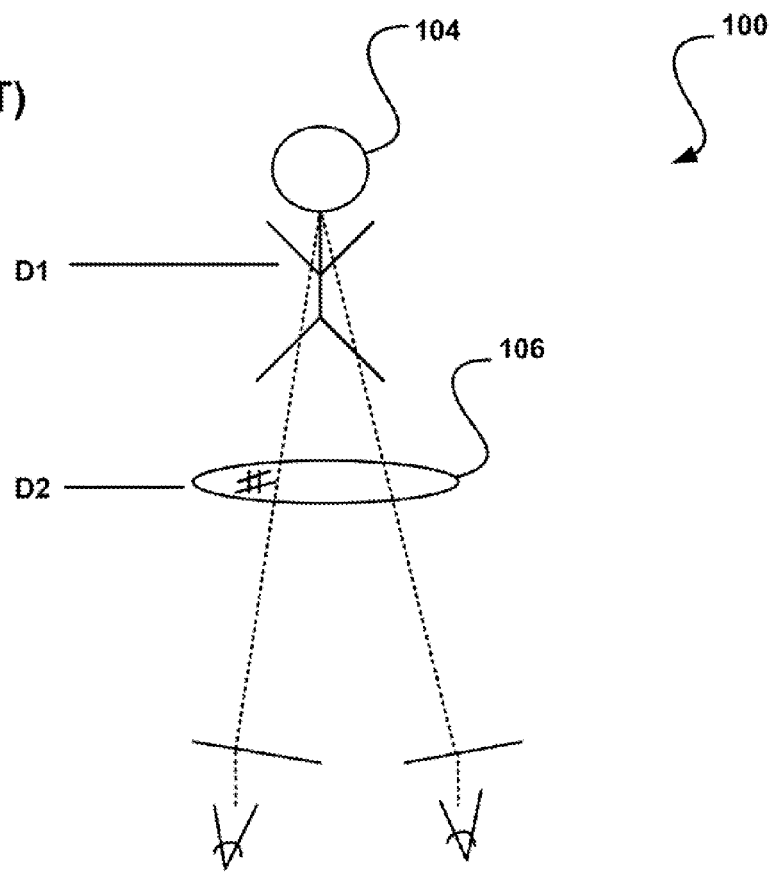
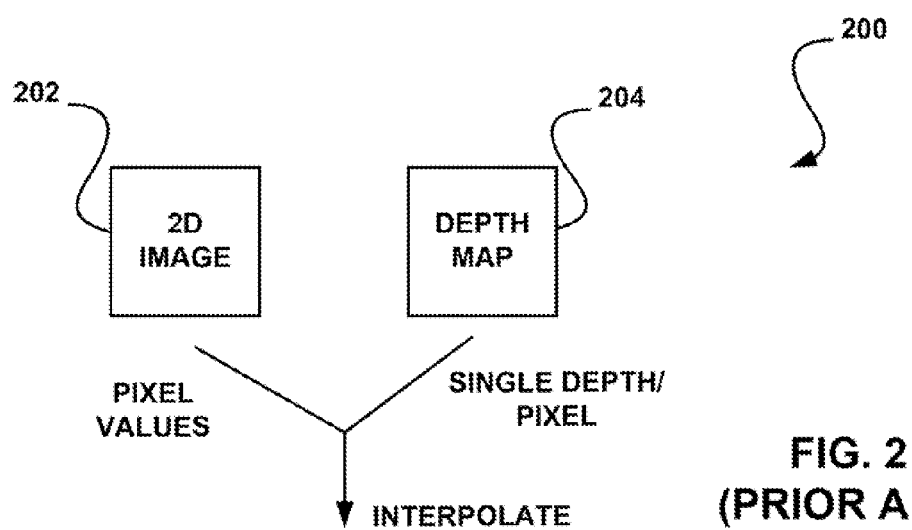
FIG. 2
(PRIOR ART)

SYSTEM AND METHOD FOR DITHERING DEPTH VALUES

FIELD OF THE INVENTION

The present invention relates to stereo display systems, and more particularly to displaying stereo display content.

BACKGROUND

Various display devices are equipped for stereo viewing. Unlike mono viewing, stereo viewing involves the display of separate content for the right and left human eye. Specifically, such stereo viewing requires the presentation of a separate image to the left and right human eye. In one particular type of stereo viewing, namely time sequential stereo viewing, such left and right images are presented in an alternating manner. To ensure a proper stereo viewing experience, stereoscopic glasses are also typically used which make the left image only visible to the left eye and the right image only visible to the right eye at the appropriate time.

Prior Art FIG. 1 illustrates a system 100 for displaying stereoscopy display content, in accordance with the prior art. As illustrated, a first object 104 is shown to be view through a transparent second object 106. As is further shown, the first object 104 has a first depth value D1 associated therewith, while the second object 106 has an associated with second depth value D2.

Prior Art FIG. 2 illustrates a technique 200 for displaying the stereoscopy display content of FIG. 1, in accordance with the prior art. As shown, the pixel values (e.g. color, depth, etc.) are assembled in the form of a two-dimensional image 202 (e.g. color map, etc.) which includes a matrix of pixel values, each associated with a particular pixel. Similarly, the depth values are assembled in the form of a depth map 204 which includes a matrix of depth values, again each associated with a particular pixel.

A problem arises when one of the aforementioned pixels is used to illustrate a portion of the first object 104 of FIG. 1 through the transparent second object 106. Specifically, the aforementioned depth map 204 is only capable of representing each pixel with a single depth value. Thus, the above problem manifests itself in deciding which of the two available depth values (D1, D2) should be used in the depth map. Of course, neither of such depth values (D1, D2) are, by themselves, correct.

There is thus a need for overcoming these and/or other problems associated with the prior art.

SUMMARY

A system, method, and computer program product are provided for dithering depth values.

BRIEF DESCRIPTION OF THE DRAWINGS

Prior Art FIG. 1 illustrates a system for displaying stereoscopy display content, in accordance with the prior art.

Prior Art FIG. 2 illustrates a technique for displaying the stereoscopy display content of FIG. 1, in accordance with the prior art.

DETAILED DESCRIPTION

Figure 3:
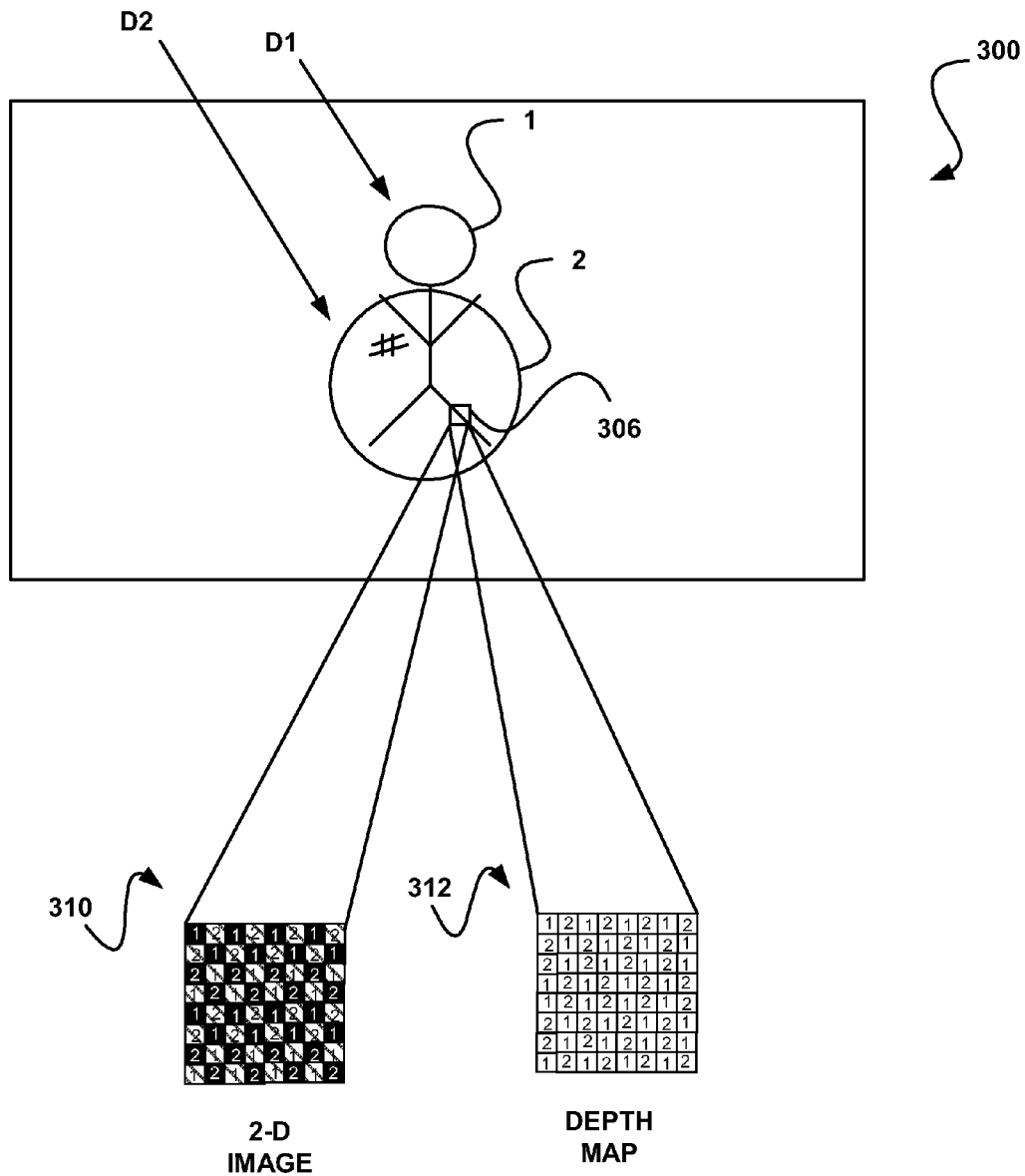
FIG. 3 shows a system for dithering depth values, in accordance with one embodiment.

FIG. 3 shows a system 300 for dithering depth values, in accordance with one embodiment. As shown, the system 300 is adapted for depicting display content. As illustrated, such display content includes a first object 1 is shown to be viewed through an at least partially transparent or translucent second object 2. As is further shown, the first object 1 has a first depth value D1 associated therewith, while the second object 2 has an associated with second depth value D2. While two objects are shown in the embodiment of FIG. 3, it should be noted that embodiments involving two or more objects are further contemplated.

At least a portion 306 of the display content is depicted utilizing a two-dimensional image 310 (e.g. color map, etc.) which includes a matrix of pixel values, each associated with a particular pixel. The system 300 further includes a depth map 312 which includes a matrix of depth values each associated with a particular pixel. In the context of the present description, the term depth value may refer to any value that is representative of a depth associated with content being displayed. For example, in one optional embodiment, such depth values may include z-values, etc.

As further shown in FIG. 3, since the first object 1 is shown to be view through a transparent second object 2, the portion 306 of the display content includes both the first object 1 and the second object 2. As further shown, the depth values of the depth map 312 include a plurality of first depth values associated with the first object 1 and a plurality of second depth values associated with the second object 2.

Specifically, in one embodiment, the first depth values are each associated with a different pixel displaying a part of the first object 1. Further, the second depth values are each associated with a different pixel displaying a part of the second object 2.

As an option, the two-dimensional image 310 may include a plurality of first color values associated with the first object 1 and a plurality of the second color values associated with the second object 2. Further, in various embodiments, a position of each of the color values in the two-dimensional image 310 corresponds with a position of each associated depth value in the depth map 312. Thus, when displayed, the color values of the correct object 1, 2 is displayed in association with the correct depth value.

In various embodiments, the first depth values and the second depth values of the depth map 312 may be stored in a predetermined configuration. For example, the predetermined configuration may entail that a string of pixels include the first depth values and the second depth values in an alternating manner. See FIG. 3, for example.

Of course, other configurations are contemplated. For instance, the configuration may take on a checkerboard pattern. Further, in various embodiments, the pattern may be static or dynamic. In one dynamic embodiment, the pattern may change as a function of the display content, randomly, etc. For that matter, any configuration may be utilized that results in at least partial dithering of the depth values. Further, in other embodiments, the color values in the color map and the depth values in the depth may even be interpolated, as desired.

To this end, depth values of two or more objects may be used in the depiction of display content. Thus, one may see a "blended" depth value reflecting such multiple depth values.

Of course, any type of dithering of the depth values may be employed. For example, another dithering embodiment is contemplated whereby the different depth values are displayed utilizing the same pixel(s) in a time sequential manner. Specifically, a first value (e.g. depth value etc.) corresponding with a first object to be displayed utilizing a pixel, after which a second value associated with a second object may be displayed utilizing such pixel. By this design, such display of the different display values may be repeated for simulating a blending of the first value and the second value.

More illustrative information will now be set forth regarding various optional architectures and features with which the foregoing framework may or may not be implemented, per the desires of the user. For example, various embodiments are contemplated where the depth values may or may not be associated with stereoscopic display content. It should be strongly noted that the following information is set forth for illustrative purposes and should not be construed as limiting in any manner. Any of the following features may be optionally incorporated with or without the exclusion of other features described.

Figure 4:
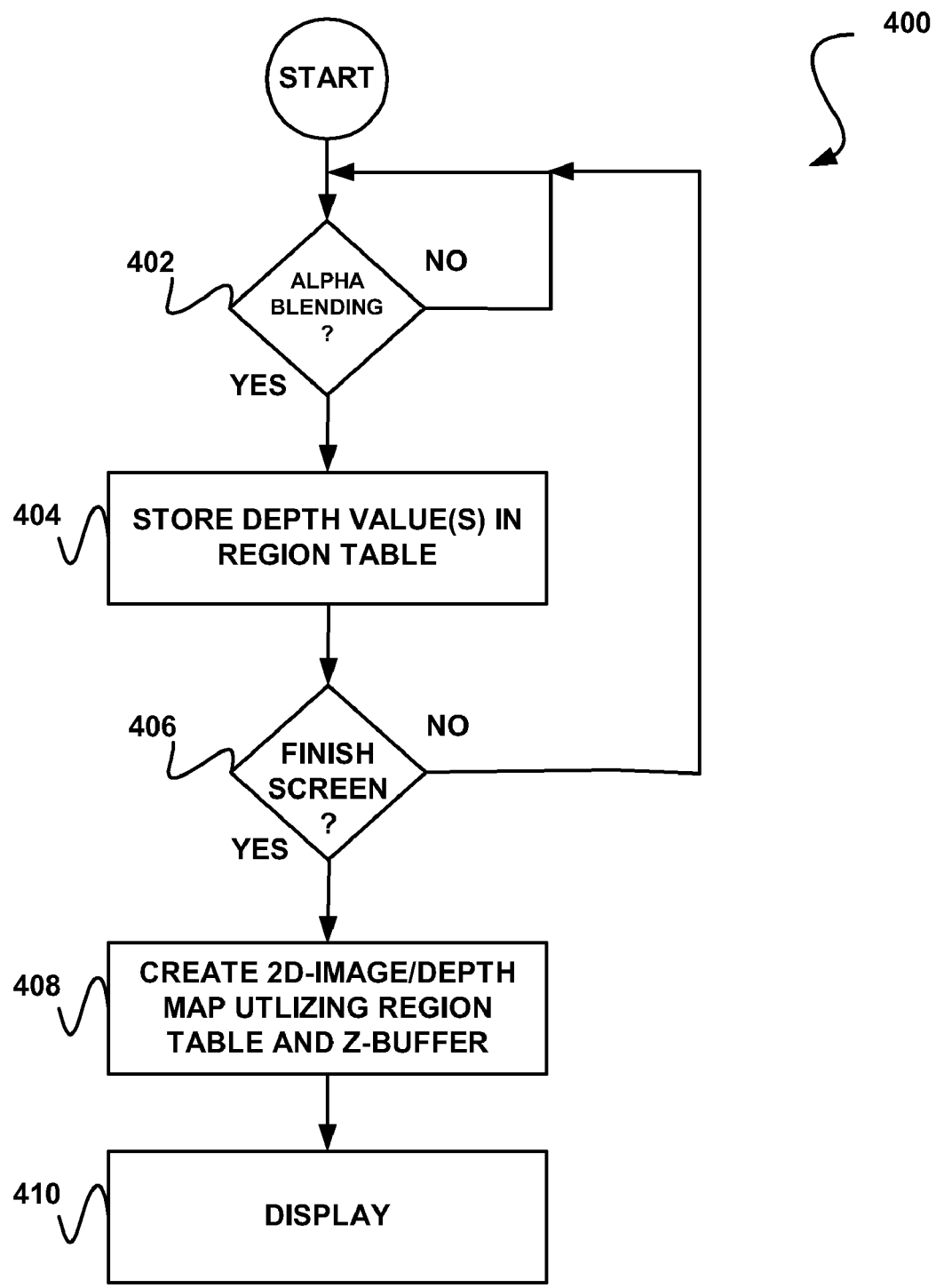
FIG. 4 shows a method for dithering depth values, in accordance with one embodiment.

FIG. 4 shows a method 400 for dithering depth values, in accordance with one embodiment. As an option, the present method 400 may be carried out to implement the system 300 of FIG. 3. Of course, however, the method 400 may be implemented in any desired environment. It should also be noted that the previous definitions apply in the context of the description of the present figure.

In one embodiment, the method 400 may be carried out for each image to be depicted on a display. As shown, the method 400 begins by determining whether display content is being displayed utilizing alpha blending. See decision 402. This may be accomplished utilizing an alpha blending setting, tag or any other indicator, for that matter.

Alpha blending is a technique for adding transparency information for translucent objects. In one embodiment, alpha blending may be implemented by rendering objects through a stipple mask with an on-off density that is proportional to the transparency of the object. The resultant color of a pixel may thus be a combination of foreground and background color. An alpha value may have a normalized value of 0 to 1 for each pixel.

If it is determined that alpha blending is being employed, it may be assumed that a particular portion of display content may at least potentially include two objects (at least one of which is at least translucent) which are to be displayed at the same time. If this is the case, the method 400 may proceed to perform dithering of the depth values of the objects.

Specifically, depth values of at least one of the objects may be stored in a region table. See operation 404. Specifically, the depth values stored in the region table may include those that are not already represented in a rendered image in a z-buffer. For example, the z-buffer may include depth values of background objects that have already been rendered. In one embodiment, a separate region table may exist for each of a plurality of regions, objects, and/or any other portion of display content to be displayed. It should be noted that the color values associated with the already-rendered background objects may be stored in a similar manner using a stored rendered surface. In use, operations 402-404 may be continued until it is determined that a complete screen of display content is finished. See decision 406.

When it is determined that a complete screen of display content is finished per decision 406, a two-dimensional image (e.g. see the color map 310 of FIG. 3, etc.) and a depth map (e.g. see the depth map 312 of FIG. 3, etc.) may be created. See operation 408. In particular, the depth values associated with one of the objects to be displayed may be received from a z-buffer, etc., while the depth values associated with one or more of the other object(s) to be displayed may be retrieved from the aforementioned region table.

By this design, the depth values may be assembled in to the depth map and further correlated with corresponding color values in any desired configuration (e.g. see FIG. 3, etc.). To this end, the values from the depth color map may be displayed to afford depth value dithering. See operation 410.

Figure 5:
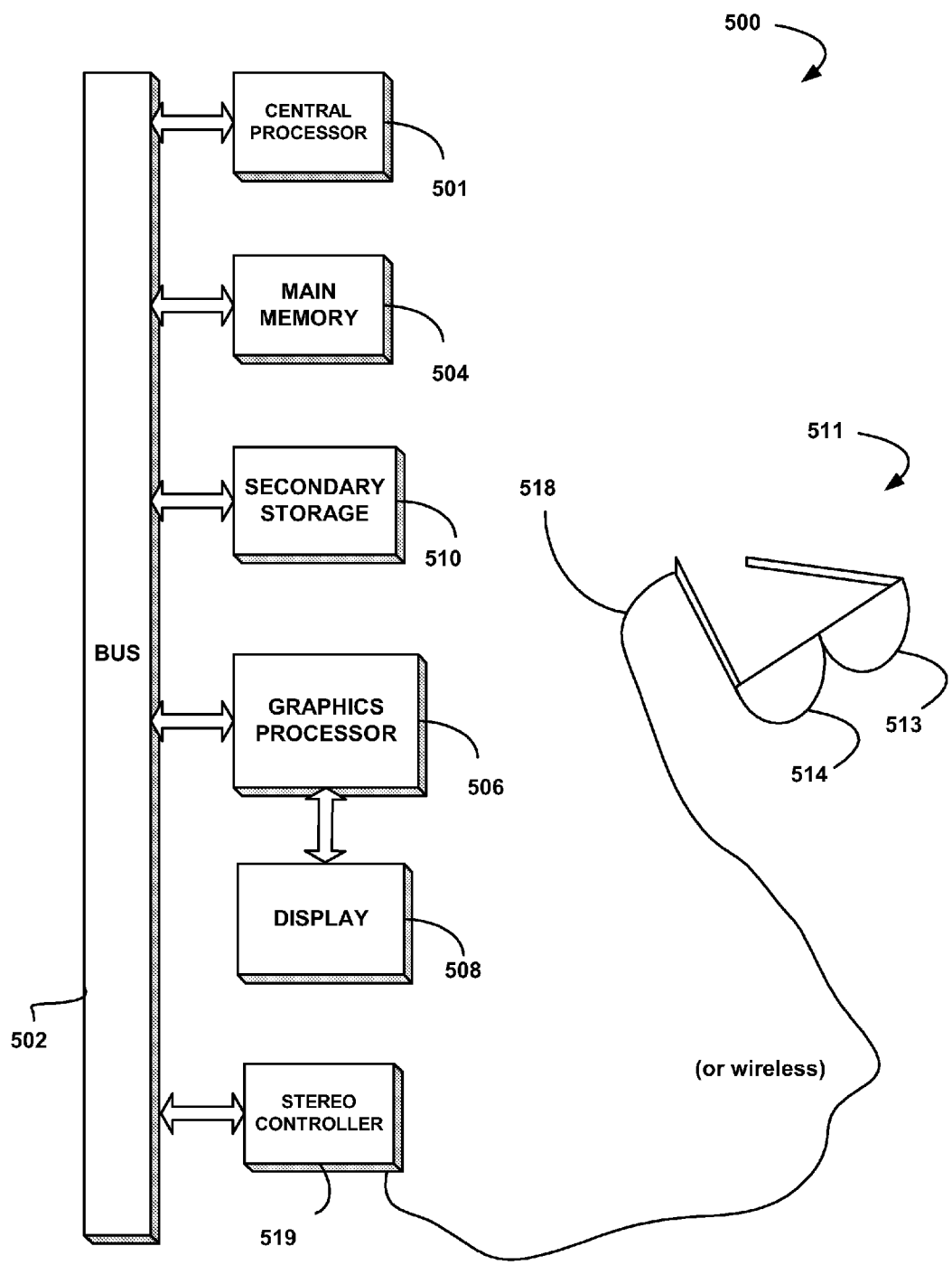
FIG. 5 illustrates an exemplary computer system in which the various architecture and/or functionality of the various previous embodiments may be implemented.

FIG. 5 illustrates an exemplary computer system 500 in which the various architecture and/or functionality of different embodiments may be implemented. As shown, a computer system 500 is provided including at least one host processor 501 which is connected to a communication bus 502. The computer system 500 also includes a main memory 504. Control logic (software) and data are stored in the main memory 504 which may take the form of random access memory (RAM).

The computer system 500 also includes a graphics processor 506 and a display 508 in the form of any of the displays mentioned hereinabove. In one embodiment, the graphics processor 506 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity. Of course, the various modules may also be situated separately or in various combinations of semiconductor platforms per the desires of the user. For example, an embodiment is contemplated where a single-chip computer or game console includes an integrated central processor, graphics processor, etc.

The computer system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504 and/or the secondary storage 510. Such computer programs, when executed, enable the computer system 500 to perform various functions. Memory 504, storage 510 and/or any other storage are possible examples of computer-readable media.

In various embodiments, the architecture and/or functionality of the various other figures may be implemented in the context of the host processor 501, graphics processor 506, a chipset (i.e. a group of integrated circuits designed to work and sold as a unit for performing related functions, etc.), and/or any other integrated circuit for that matter. Still yet, the architecture and/or functionality of the various following figures may be implemented in the context of a general computer system, a circuit board system, a game console system dedicated for entertainment purposes, an application-specific system, and/or any other desired system.

As an option, further included may be a pair of stereo glasses 511 capable of being worn on a face of a user. While the stereo glasses 511 are shown to include two elongated members for supporting the same on the face of the user, it should be noted that other constructions (e.g. member-less design, head strap, helmet, etc.) may be used to provide similar or any other type of support. As further shown, the stereo glasses 511 also include a right eye shutter 514 and a left eye shutter 513.

Both the right eye shutter 514 and left eye shutter 513 are capable of both an open orientation and a closed orientation.

In use, the open orientation allows more light therethrough with respect to the closed orientation. Of course, such orientations may be achieved by any desired mechanical, electrical, optical, and/or any other mechanism capable of carrying out the above functionality.

For control purposes, the stereo glasses 511 may be coupled to a stereo controller 519 via a cable 518 (or without the cable 518 in a wireless environment). In various embodiments, the stereo controller 519 may reside in any location associated with the computer system 500, the stereo glasses 511, and/or even in a separate module, particularly (but not necessarily) in an embodiment where the graphics processor 506 is attached to a separate interface [e.g. universal serial bus (USB), etc.] on the computer system 500. As shown, in one embodiment, the display 508 may be directly connected to the graphics processor 506, and the stereo controller 519 may further be directly connected to the computer system 500 via a USB interface or any other interface, for that matter. In other embodiments, the stereo controller 519 may be coupled between the graphics processor 506 and the display 508 for carrying out the desired functionality. Of course, the stereo controller 519 may comprise any hardware and/or software capable of the providing such desired functionality.

Specifically, in some embodiments, the right eye shutter 514 and left eye shutter 513 are controlled to switch between the closed orientation and the open orientation. This may be accomplished in any desired manner. Just by way of example, the graphics processor 506 may provide appropriate left/right control signals to the stereo controller 519 over the bus 502, USB interface, etc.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A computer implemented method for dithering depth values;
    wherein the depth values include a plurality of first depth values associated with a first object and a plurality of second depth values associated with a second object;
    wherein the first depth values and the second depth values are stored in a depth map, utilizing a processor;
    wherein further included are color values including a plurality of first color values associated with the first object and a plurality of second color values associated with the second object;
    wherein the first color values and the second color values are stored in a color map;
    wherein a position of each of the color values in the color map correspond with a position of each associated depth value in the depth map;
    wherein the first depth values and the second depth values are stored in the depth map in a predetermined configuration;
    wherein the predetermined configuration takes on a checkerboard pattern.

2. The method as recited in claim 1, wherein the first object or the second object is transparent.

3. The method as recited in claim 1, wherein the first object or the second object is translucent.

4. The method as recited in claim 1, wherein the first depth values are each associated with a different pixel displaying a part of the first object, and the second depth values are each associated with a different pixel displaying a part of the second object.

5. The method as recited in claim 1, wherein the predetermined configuration entails that a string of pixels include the first depth values and the second depth values in an alternating manner.

6. The method as recited in claim 1, wherein the color values in the color map and the depth values in the depth map are interpolated.

7. The method as recited in claim 1, wherein the depth values are associated with stereoscopic display content.

8. The method as recited in claim 7, wherein the stereoscopic display content is displayed utilizing a liquid crystal display.

9. The method as recited in claim 7, wherein the stereoscopic display content is viewed utilizing stereoscopic glasses.

10. A computer implemented method, comprising:
    (a) outputting, using a processor, a first value corresponding with a first object to be displayed utilizing a pixel; and
    (b) outputting, using the processor, a second value associated with a second object to be displayed utilizing the pixel;
        wherein the first object or the second object is translucent and operations (a) and (b) are repeated for simulating a blending of the first value and the second value;
        wherein the first value and the second value are included in a plurality of depth values, the depth values including a plurality of first depth values associated with the first object and a plurality of second depth values associated with the second object;
        wherein the first depth values and the second depth values are stored in a depth map in a predetermined configuration;
        wherein the predetermined configuration takes on a checkerboard pattern.

11. A system for dithering depth values utilizing a display;
    wherein the depth values include a plurality of first depth values associated with a first object and a plurality of second depth values associated with a second object;
    wherein the system is operable such that the first depth values and the second depth values are stored in a depth map;
    wherein further included are color values including a plurality of first color values associated with the first object and a plurality of second color values associated with the second object;
    wherein the system is operable such that the first color values and the second color values are stored in a color map;
    wherein a position of each of the color values in the color map correspond with a position of each associated depth value in the depth map
    wherein the system is operable such that the first depth values and the second depth values are stored in the depth map in a predetermined configuration;
    wherein the predetermined configuration takes on a checkerboard pattern.

12. The system as recited in claim 11, wherein included is a graphics processor which is in communication with the display and a central processing unit via a bus.

* * * * *